United States Patent [19]
Olvey

[11] Patent Number: 6,030,477
[45] Date of Patent: *Feb. 29, 2000

[54] METHOD OF MAKING A COMPOSITE OF PAPER AND PLASTIC FILM AND COMPOSITES

[75] Inventor: Michael W. Olvey, Fairburn, Ga.

[73] Assignee: Laminating Technologies, Inc., Atlanta, Ga.

[*] Notice: This patent is subject to a terminal disclaimer.

[21] Appl. No.: 09/105,722

[22] Filed: Jun. 26, 1998

Related U.S. Application Data

[63] Continuation-in-part of application No. 08/487,631, Jun. 7, 1995, Pat. No. 5,772,819.

[51] Int. Cl.$^7$ ............ B32B 31/12; B32B 31/20; B32B 31/30
[52] U.S. Cl. .......... 156/82; 156/244.16; 156/244.18; 156/244.23; 156/244.27; 156/250; 156/272.6; 156/210; 156/324
[58] Field of Search .................. 156/82, 210, 244.23, 156/244.27, 324, 244.16, 244.18, 250, 259, 272.6

[56] References Cited

U.S. PATENT DOCUMENTS

| | | |
|---|---|---|
| 3,862,869 | 1/1975 | Peterson et al. |
| 4,254,173 | 3/1981 | Peer, Jr. |
| 4,544,597 | 10/1985 | Peer, Jr. et al. |
| 4,865,912 | 9/1989 | Mitsumata ............ 428/285 |
| 5,772,819 | 6/1998 | Olvey. |
| 5,888,714 | 3/1999 | Bourdelais et al. ............ 430/536 |

FOREIGN PATENT DOCUMENTS 726949  3/1955  United Kingdom.

*Primary Examiner*—Sam Chaun Yao
*Attorney, Agent, or Firm*—Deveau & Marquis

[57] ABSTRACT

Composites of paper and bioriented polyester plastic film are made by passing a web of paperboard and a web of plastic film, with a layer of extruded molten polymer impregnating and bonding agent between the webs, through a nip. The process involves controlling one or more of the speed of the webs, the temperature of the molten polymer, the pressure or spacing of the rolls at the nip, and the rate of extrusion, relative to the porosity and surface characteristics of the paper web such that a portion of the molten polymer impregnates partially into and becomes part of the paper web and a substantial portion lies outwardly of the surface of the paper web and solidifies to form a new surface to which the film is bonded and which it is supported clear of the paper surface. The molten polymer may be polyethylene or an ethylene acrylic acid copolymer. These composites are useful in forming corrugated structures which may be used for baking in convection ovens.

20 Claims, 2 Drawing Sheets

METHOD OF MAKING A COMPOSITE OF PAPER AND PLASTIC FILM AND COMPOSITES

This application is a continuation-in-part of application Ser. No.: 08/487,631, filed Jun. 7, 1995 U.S. Pat. No. 5,772,819.

BACKGROUND OF THE INVENTION

FIELD OF THE INVENTION

This invention relates to composites of paper and plastic film, to corrugated paperboard incorporating such a composite as a liner adhered to the corrugated medium, and to methods of making the composites and the corrugated paperboard. A corrugated paperboard incorporating this composite has a liner component is especially useful as a sheet on which bakery goods are baked. It has been found that this composite liner will withstand temperatures in an oven up to 350° F. for a period of forty to eighty minutes even though the internal temperature of the bakery product will reach an internal temperature of 200–208° F. This composite liner is especially useful because of the excellent release characteristics from the baked product following baking. Use of the composite eliminates the need for and reduces the requirement for the use of grease in the baking process. The bakery product can be baked upon a composite sheet or in a tray made from the corrugated paperboard incorporating the composite as a liner. The invention is also useful in the packaging field in the form of containers, but it finds advantageous utility in the fabrication of other products, such as point-of-purchase displays, wall panels, posters, and the like, where a combination of the unique structural features of the invention and high quality graphics is desired. The invention is particularly felt to satisfy a long-felt need in the area of folding cartons for packaging, whether as primary packaging or secondary packaging, in composite form or as a liner for corrugated paperboard. The moisture barrier characteristics of the composite liner board permits the construction of cartons that can be used to keep a product cold with ice which is retained within the carton as it melts. Corrugated paperboard having a composite liner board component can also be utilized for keeping a product hot for a period of time because of the resistance of the composite to heat and its ability to retain heat within the carton. Although the composite of paper and plastic film is highly useful and advantageous in itself, it is a particularly important characteristic of the composite that it can withstand the conditions in the "double backer" part of a conventional corrugating machine such that it can be combined with a single faced corrugated board to form a double faced corrugated board without material deterioration of the composite which, to my knowledge, has previously been considered impossible as a practical matter. Important characteristics of the composites alone or as incorporated in corrugated paperboard include scuff and scratch resistance, strength, stretch resistance, tear resistance, separation resistance, resistance to "checking" (cracking in a score line) in the forming of blanks for folding cartons, surface smoothness and gloss, graphics quality and durability, fragrance barrier quality, and moisture barrier quality.

BACKGROUND

It is known in the packaging and other arts to form packaging material in the form of a laminate of paper and plastic film secured together by an adhesive. For instance, particularly in the field of flexible packaging, various films have been laminated to paper with various adhesives, of which polyethylene is one example. For instance, I am aware that a flexible packaging material has been made by laminating "Mylar" polyester film (a product of E. I. DuPont DeNemours & Co. Inc., Wilmington, Del., U.S.A.) to thin high-quality paper using a polyethylene adhesive. I am also aware of Peer U.S. Pat. No. 4,254,173 issued Mar. 3, 1981, which proposes a secondary container packaging material (e.g., a six-pack can or bottle wrap) comprising a paper material laminated to a plastic film. The patent discloses various films, including polyester, various papers such as Kraft paper of various weights, and various adhesives, including polyethylene, to bond the film to the paper. It is disclosed in this patent and generally known otherwise that the film can be reverse printed with graphics prior to lamination. To my knowledge, all prior proposals have used the adhering agent only as an adhesive and, thus, have used only that amount necessary to achieve adhesion of the two laminated components. I do not find in the prior art any recognition or appreciation of the possibility of using the adhering agent not just as an adhesive, but rather as an impregnant and surface enhancer so as to achieve the characteristics and advantages of the present invention.

It is a basic purpose of the present invention to provide an improved composite of paper or paperboard and plastic film in which the adhering agent is used not merely as an adhesive, but rather as an impregnating and bonding agent and as an enhancer of the paper surface by essentially forming a new surface above the paper or paperboard. By operating under conditions which ensure substantial impregnation of the adhering agent into the paper, but with a substantial part overlying the surface of the paper and firmly adhering to the plastic film, I obtain a product which is highly resistant to separation, which enhances the graphics quality of reverse printed film, which will withstand the rigors of the double-backer portion of a conventional corrugating machine, which minimizes the normal adverse effects of scoring, cutting and folding, in the formation of a carton, and which generally is a new and improved product capable of many uses.

It is a further purpose of this invention to develop a composite paperboard material that can be used as a sheet for baking bakery goods which would eliminate or reduce the need for grease as a release agent for bakery goods after baking. It is a further purpose to develop a composite paperboard with good moisture resistant characteristics for use in baking products or in keeping products cool within a carton made of the composite paperboard.

FEATURES AND ASPECTS OF THE INVENTION

In making a composite of paper and plastic film in accordance with my invention, a web of paper and a web of plastic film are passed into and through the nip of a pair of nip rolls, and a layer of molten polymer-impregnating and bonding agent is extruded into the nip between the webs on the entry side of the nip. One or more of the speed of the webs, the temperature of the molten polymer, the pressure or spacing of the rolls at the nip, and the rate of extrusion is or are controlled relative to the porosity and surface characteristics of the paper web such that a substantial portion of the molten polymer impregnates partially into and becomes part of the paper web, and a substantial portion lies outwardly of the surface of the paper web and solidifies to form an enhanced surface. This surface is essentially a new surface, to which the film is bonded and on which it is supported clear of the paper surface. There is collected from the nip rolls a composite comprising paper partially impregnated with solidified polymer, a contiguous layer of solidified polymer having the new surface outwardly of the paper surface, and the plastic film bonded to the new surface. In the preferred practice of the invention, the inner surface of the film is reverse printed with desired graphics by any of several printing processes. Preferably the molten polymer comprises polyethylene, the film is bioriented, and the paper is Kraft paper. The molted polymer may be a copolymer of ethylene and acrylic acid. A particularly preferred film is bioriented polyester. Adherence of the components in the resulting composite is such that peeling essentially is not possible, in that the fibers of the paper will separate before the solidified polymer or the film will peel from the paper. As mentioned above, one of the most important and, indeed, surprising features of the composite is that it can be passed through the double-backer portion of a conventional corrugating machine to form the outside liner of a double-faced corrugated paperboard, which typically involves movement of the exposed face of the film along a hot plate section maintained at temperatures up to about 350° F. Equally as important and surprising is the ability of either the composite or the corrugated paperboard of which it forms the outer liner surface to withstand the rigors of formation into folding carton blanks and folded cartons with little or no separation, "checking", etc. The graphics quality which can be obtained and maintained in the end product is believed to be decidedly superior.

While the foregoing sets forth some of the basic features and aspects of the invention, subsidiary features and aspects of varying degrees of importance will be brought out in or apparent from the ensuing description and illustration of preferred embodiments.

DESCRIPTION OF THE PREFERRED EMBODIMENTS

Figure 2:
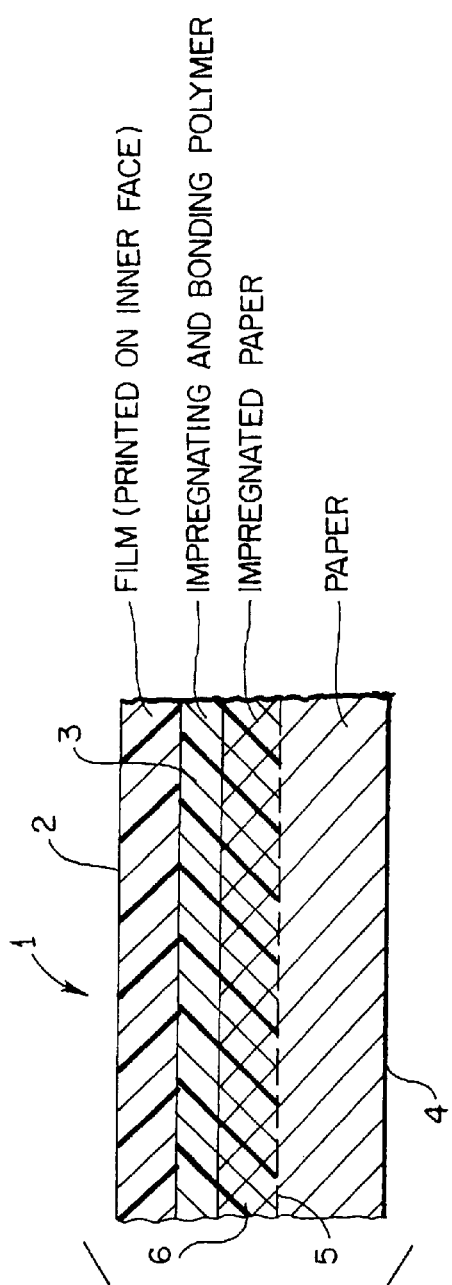
FIG. 2 is a schematic section (not to scale) of the preferred embodiment of the composite.

Referring to FIG. 2 of the drawings, the composite of the invention is shown at 1. The composite includes a paperboard substrate 4, a reverse printed plastic film 2, and an impregnating and bonding polymer 3. It should be realized that the plastic film 2 does not need to be reverse printed unless it is desired. As shown, the polymer has been caused to partially impregnate the paper 4 so as to form a substantial thickness of impregnated paper 6. At the same time, a substantial portion of the polymer 3 lies outwardly of the paper surface and essentially forms a new and enhanced surface relative to that of the paper, the reverse printed film being supported on and firmly adhered to the new enhanced surface provided by the polymer 3. The impregnation depth of the polymer into the paper is indicated at 5. The composite 1 differs markedly from the prior art of which I am aware because of the degree of impregnation of the polymer into the paper and the extent to which the new enhanced surface provided by the polymer lies outwardly of the paper surface so as to prevent or at least minimize surface characteristics of the paper affecting the reverse printed film 2. In the conventional prior art laminates of which I am aware, the conventional adhesive does not impregnate the paper at least to any substantial extent, and the fibrous character of the paper surface adversely affects the appearance of the film. This latter characteristic of the prior art can be, and probably has been, alleviated to some extent by using a high quality clay-coated paper as the substrate. However, clay-coated paper is expensive and still would not provide the enhanced surface provided by the overlying polymer in accordance with the present invention. Also, clay-coated paper is relatively less porous than conventional Kraft paper such that it would be more difficult to obtain the desired impregnation of the polymer. Without substantial impregnation, together with the overlying polymer, the product simply would not withstand the rigors of folding carton formation while providing a high quality, commercially viable end product. Nor would it withstand the conditions in the doublebacker portion of a conventional corrugated board making machine.

Figure 3:
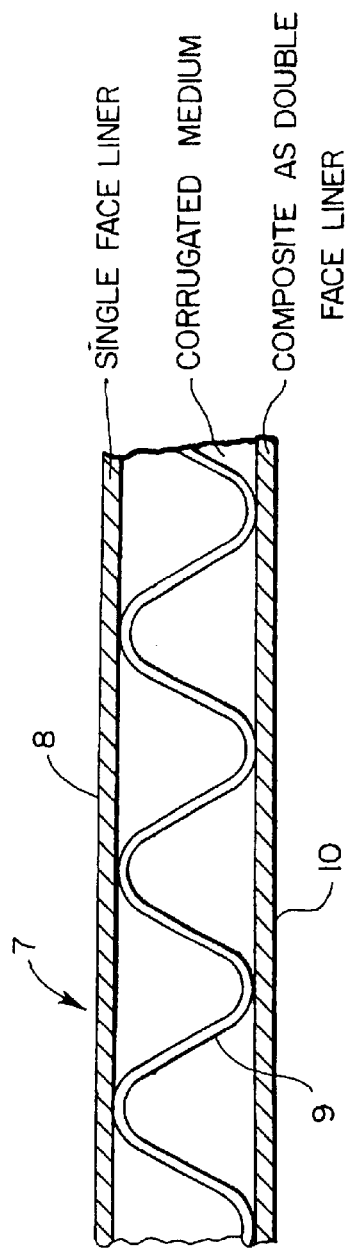
FIG. 3 is a schematic section of a double-faced corrugated paperboard in which the composite is incorporated as the double face liner.

FIG. 3 illustrates a double-faced corrugated paperboard structure which is conventional apart from the incorporation of the composite of the invention as the double face liner, as shown at 10. The otherwise conventional corrugated paperboard structure 7 comprises a corrugated medium 9 and a single face liner 8. While FIG. 3 illustrates only one corrugated medium 9 and one single face liner 8, the combination of which is typically known as single faced corrugated board, it will be understood that there are known in the art corrugated paperboard structures consisting of two, three or more single faced boards glued to each other, the single face liner of one single faced board being glued to the corrugated medium of another single face liner so as to form a built-up structure. For instance, such a combination of three single-faced boards is typically referred to as triple wallboard. It is to be understood, therefore, that the present invention encompasses also such built-up structures in which the composite 10 forms the outer liner, such a built-up structure being exemplified by picturing FIG. 3 as including one, two or single faced-boards above and adhered to single face liner 8 or to the corresponding single face liner of a further single faced board.

Figure 1:
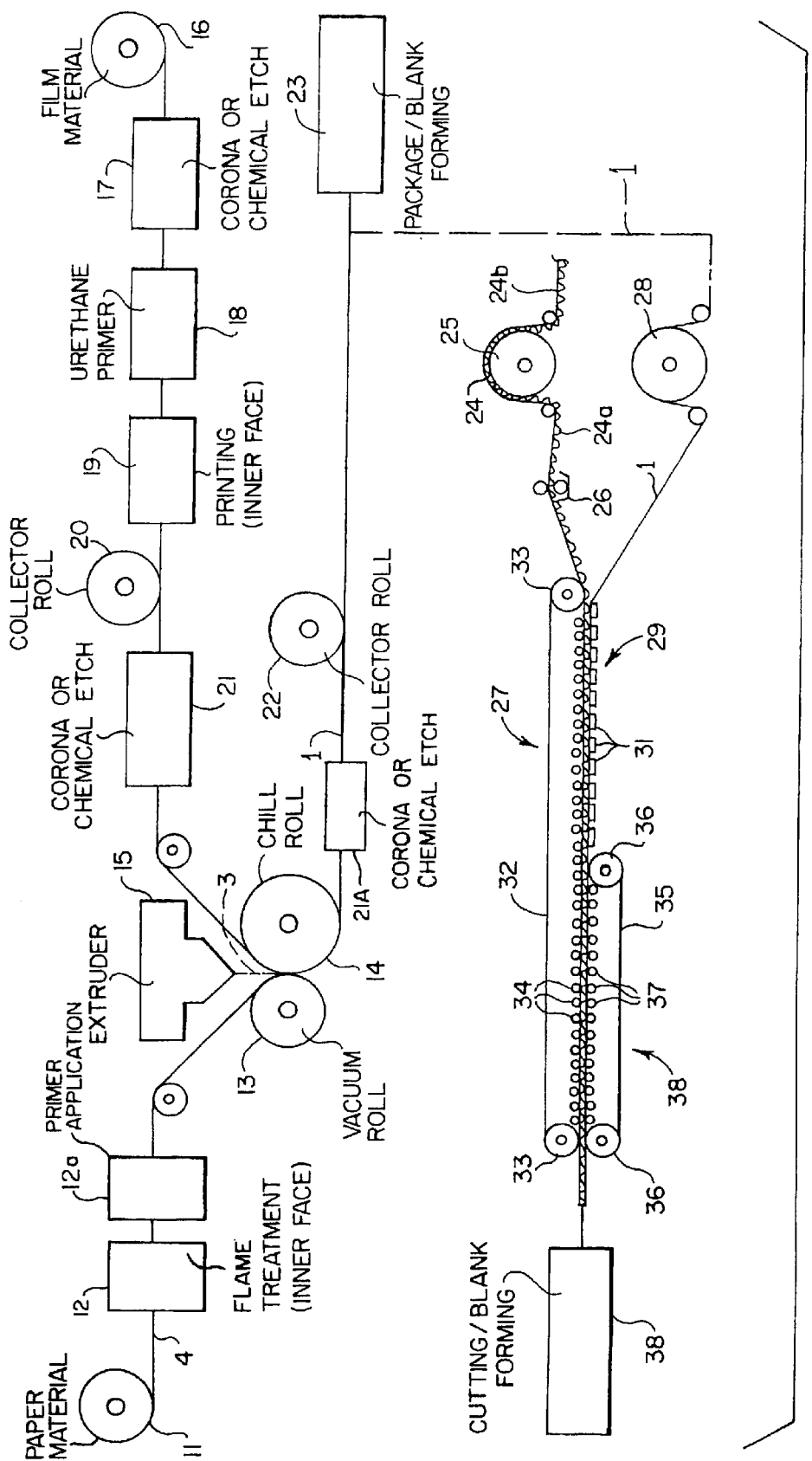
FIG. 1 is a diagrammatic illustration of apparatus and steps involved in practicing preferred embodiments of the invention, including the fabrication of the composite and optional incorporation of the composite in a double-faced corrugated paperboard.

Referring now to FIG. 1, there is illustrated in the upper part of the figure a diagrammatic representation of apparatus for and the process of making the composite of paper and plastic film. Collector rolls are shown at 20 and 22 to reflect the fact that various parts of the process may be formed at different times and in different locations, although the process could be continuous. From the point represented by the second collector roll 22, the completed composite can be passed to apparatus, schematically indicated at 23, for formation into a package or blank or any other form, typically involving cutting, scoring, slitting, etc. Alternatively, the completed composite I can be passed to a corrugated board making machine for incorporation as the outside liner of a double faced corrugated board. Thus, the lower part of the figure, connected by the broken line, illustrates a typical "double backer" part of a conventional corrugated board making machine as shown in, for example Griffith et al. U. S. Pat. No. 3,434,901 dated Mar. 25, 1969. From this "double backer" part of the machine, the double faced corrugated board is passed to a conventional cutting or blank forming station shown at 38 where it may be cut into sheets, formed into container blanks for forming containers or baking trays.

As shown in the upper part of FIG. 1, paper material, typically conventional Kraft paper or paperboard, is led from a roll 11 through a flame treatment station 12 where the inner surface (the upper surface as viewed in FIG. 1) is flamed by a gas burner or burners to burn off loose fibers and reduce the water content. This has two-effects. First, it provides a better paper surface by burning off loose fibers, dust, etc. Second, by reducing the moisture content, it aids in the later impregnation of the molten polymer into the paper since the molten polymer seeks to replace the driven off moisture. The flame treatment is controlled so as not to drive off all the moisture, or too much moisture, particularly from the opposite face of the paperboard, since otherwise the opposite face would be so dry as to re-attract moisture later and cause unwanted curling. Basically, the important point is to slightly lower and control the moisture content on the inner face so as to facilitate the desired later impregnation of the molten polymer.

From the flame treatment station 12 the paper is passed to a primer application station 12a where the upper surface of the paper is primed (e.g., by a roller applicator) with a primer that facilitates and enhances penetration of the molten polymer into the paper when the molten polymer is extruded into the nip of the nip rolls at the combining station. Thus, the primer acts in the nature of a flux for the molten polymer. Such primers are known in the extrusion coating art, and a typical primer usable in the preferred process of the present invention is marketed in the United States by Morton Chemical Company under the brand name or trademark "Adcote".

From the primer application station 12a, the paper 4 passes into the nip between a pair of nip rolls 13 and 14 where it is combined with the plastic film and molten polymer 3 which is extruded into the nip from extruder 15 at a high temperature. As shown, nip roll 13 is preferably a vacuum roll, which is simply a roll having its surface covered with very small holes, the interior of the roll being connected to vacuum or suction such that the paper 4 on the surface of the roll 13 can be subjected to a controllable suction to assist or control penetration of the molten polymer into the porous paper. The use of a vacuum roll is not critical to the invention, but it can provide an added measure of control or enhancement of impregnation. Correspondingly, nip roll 14 is illustrated as a chill roll to quickly set or harden the molten polymer 3 to protect the film, but not so quickly as to adversely affect the desired substantial impregnation of the extremely hot polymer into the paper.

The plastic film entering the nip between the nip rollers starts from a roll 16 of plastic film material. The film is passed through a treatment station 17 where it is subjected to corona discharge treatment or chemical etching of its inner surface (the upper surface as viewed in FIG. 1). In general, the corona treatment might be described as bombardment with electrons to create minute surface crevices and cracks. The chemical etching with a solvent or acid can be considered as giving a somewhat scuffed surface. Either surface treatment has a number of desirable effects. Thus, there is a greater bonding area by virtue of the surface "roughening". It is believed that there is less melting resistance at the peaks of the minute crevices or cracks, such that the later heat of the molten polymer tends to melt these peaks and provide better fusion between the film and the polymer. The reduced melting resistance at the peaks tends to slow dissipation of heat. Furthermore, it is believed that the film treatment has what might be termed a "rip-stop" effect, in that it tends to make the point of least resistance against separation of the composite in the paper itself. Still further, the film treatment is believed to increase the heat resistance of the film, among other things and hence permit more latitude on the extrusion temperature of the molten polymer. As is already known, the plastic film can be purchased with one or both surfaces already pretreated, and either treated or untreated film can be used in the present invention. Preferably even factory pretreated film is treated again, before or after printing, or both, since treating after printing does not affect the print quality, and such post-printing treatment is believed to enhance the ultimate bond.

From the corona or chemical etch station 17, the film passes to a primer station 18 where any conventional primer, typically a urethane primer, is applied to the inner surface of the film. Various such primers are known in the art for improving the bond between a plastic film and ink. A urethane primer is believed to avoid or minimize problems which might otherwise occur when the molten polymer contacts the printed film.

From primer station 18, the film passes to a printing operation 19, which can be any of various printing techniques known in the art, such as flexography, offset and gravure, using solvent-based or water-based inks.

Although not illustrated in FIG. 1, the printed film optionally can be primed again after printing, which, as stated previously, can eliminate or minimize the possibility of problems when the molten polymer contacts the ink. Thus far, this additional priming step is not considered critical in preferred embodiments of the invention and, therefore, can be considered as optional, although probably advantageous under particular conditions.

As previously stated, the reverse printed film can then be passed to a collector roll for storage, transport, etc. Alternatively, it could be passed directly from the printing station 19, as well as from the collector roll 20, to a further corona discharge treatment or chemical etch operation indicated at 21. This further treatment does not affect the print quality and is believed to facilitate the bond between the molten polymer and the printed film.

The film then passes into the nip between nip rolls 13 and 14 to be combined with the molten polymer 3 from extruder 15 and the paper 4, from which nip rolls the composite passes through a further corona discharge treatment or chemical etch station 21a for treatment of the outer film surface of the composite, and onto a collector roll 22.

The molten polymer 3 from the extruder 15 is preferably polyethylene of low density and a melt index between 12 and 15. In general, the lowest density polyethylene that gives a satisfactory result is used. However, where the composite is intended for use as the outer face of a double faced corrugated board, there should be used the lowest density polyethylene that will withstand the temperature and other conditions in the "double backer" part of the corrugated board making machine.

A co-polymer of ethylene and acrylic acid may also be used. It offers the advantage that it can be extruded at 540° F., while the low density polyethylene is extruded at approximately 620° F. The lower temperature of the extrusion of the co-polymer of ethylene and acrylic acid has less effect on any ink that is used on the film. Preferably the ethylene acrylic acid co-polymer has an acrylic acid content of from 5–25% by weight.

Controlling the moisture content near the surface of the paper by flame treatment permits the impregnation of the molten polyethylene into the paperboard as it replaces driven-off moisture. This molten polymer is not merely an adhesive, but impregnates the paper and forms a new plastic surface on the paper to which the film is bonded. A larger amount of molten polyethylene is used because of the necessity of impregnating the paperboard than if it were merely an adhesive. A low density polyethylene (LDPE) is preferred, but a small amount of high density polyethylene (HDPE) may be incorporated with the LDPE. Ethylene-acrylic acid co-polymer may be used in place of the LDPE.

Conditions are controlled and varied at the combining station to give the desired product. Thus, impregnation of the molten polymer, preferably polyethylene, into the paper is controlled by controlling the temperature of the molten polymer and the machine speed, the machine speed being controlled by controlling the speed of the take-up or collector roll 22. The thickness of the molten polymer passing into and through the nip is controlled by controlling the speed of the take-up or collector roll, and hence the rate of travel of the paper and film through the nip. Additionally, the spacing of the nip rolls can be varied. In a preferred arrangement, one of the nip rolls is spring loaded or pneumatically loaded, and the spring pressure or pneumatic pressure can be controlled. in general, although practically any of the conditions at the combining station could be controlled and varied as needed, including the pressure or spacing of the nip rolls, the thickness, temperature and viscosity of the molten polymer, the speed of the webs, and the rate of extrusion, generally it suffices to controllably vary only three conditions, these being the take-up roll speed, the temperature of the molten polymer, and the spring or pneumatic pressure on the molten polymer, and the spring or pneumatic pressure on the adjustable nip roll. Theoretically, it would be possible to vary the speed by controllably varying the speed of the nip rolls, but this would be an unnecessary complication relative to varying the speed of the take-up roll. The variation of operating parameters is within the skill of one in the art, and requires only routing experimentation.

The schematically illustrated apparatus for making the composite should be considered as merely typical, although presently preferred. In general, the process of making the composite can be carried out on properly controlled conventional machinery normally used for extrusion coating paper if modified to additionally handle the film. In the typical practice of the process, the treated and reverse printed film is taken up on collector roll 20, which is thereafter transported to, and mounted on, the combining machinery, appropriately modified as required. As previously mentioned, this could be conventional machinery for extrusion coating paper modified to handle and treat the plastic film.

The primary purpose of the corona discharge treatment or chemical etch treatment indicated at 21a is to facilitate gluing of the outer surface of the film to itself or some other surface in the fabrication of boxes, containers, etc. Thus, it will be understood that the treatment at station 21a is of the outer surface of the film part of the composite.

The package/blank forming operation indicated at 23 may be any conventional operation for forming carton blanks, cartons, boxes, containers, or simply cutting the composite into individual sheets for use as desired.

To combine the completed composite as part of a corrugated structure, the roll of composite can be mounted in a conventional corrugating machine as the supply roll for the outside liner of double faced corrugated board, as diagrammatically indicated in the lower part of FIG. 1. As seen in the lower part of FIG. 1, which shows a typical, prior art, double backer operation, single faced corrugated board 24, consisting of a web of corrugated medium 24a having a coextensive web of liner 24b bonded to tips of the corrugations on one side thereof, is trained over a preheater drum 25. The single face 24, after having its temperature raised to perhaps 150–200° F. by the preheater drum 25, is then passed over an adhesive applicator 26 and into the combining section generally indicated at 27. The composite 1, constituting a web of outside liner, is also trained over a preheater drum 28 and thence into the combining section 27 where it is pressed against the adhesive covered flute tips of the single faced board. Of course, the paper face of the composite is the upper face as viewed in the lower part of FIG. 1, such that the corrugated medium 24a is pressed against the paper face of the composite 1. The combining section consists, basically, of two parts: a hot plate section 29 and a draw section 38. Heat is applied in the hot plate section by a series of steam heated chests 31 having their upper portions aligned to provide a heated, substantially continuous surface. An endless belt 32, trained about a pair of driven rollers 33 and having a series of smaller rollers 34 bearing on its lower reach, serves to press the single faced board 24 and composite toward the steam cheat 31. A second belt 35, trained about driven rollers 36 and pressure rollers 37, cooperates with the downstream portion of the belt 32 to grip the assembled single faced board and composite outside liner 1 and draw them through the double backer apparatus. The completed double faced-board is then passed to an appropriate operation station indicated at 38 for cutting, box blank forming, or whatever operation is desired. Apart from the incorporation of the novel composite as the outside liner, the lower portion of FIG. 1 may be regarded as conventional and, indeed, this is one of the great advantages of the invention in that this is the first instance of which I am aware in which a double faced corrugated board can be made on a conventional double backer corrugating machine while providing an outside liner having the features and characteristics of the composite of the present invention. Thus, the invention provides not only a new and advantageous composite of paper and plastic film useful in itself, but also provides a composite which can successfully withstand the conditions involved in passing through the double backer part of a conventional double faced board corrugating machine as the outside liner.

In the finished composite, adherence of the original components is such that they are essentially inseparable, that is, peeling is practically impossible. The weakest point against separation is in the unimpregnated part of the paper, and the fibers of the paper will separate before the molten polymer, preferably polyethylene, will peel from the paper, and typically before the plastic film will peel from the polyethylene impregnant and bonding agent. It is indeed surprising that the composite can go through a double backer corrugator with no or little damage to the film or the polyethylene impregnate and bonding agent, considering that the heat plates of the corrugator typically involve temperatures of up to 350° F., a temperature at which regular adhesives will not stand up and, indeed, a temperature at which it is believed that the polyethylene of conventional "poly mounted" laminates will not stand up. Furthermore, polyethylene being moisture resistant, the new composite with impregnated polyethylene is highly resistant to separation even when wet.

Successful runs of the composite have been made in a Langston 87" XB corrugator, 1965 model, the heat tables in the double backer being at a temperature of approximately 340° F. The composite should run well in similar conventional machines under normal commercial operating conditions, or perhaps in. some instances, with minimal deviations from normal commercial operating conditions. It is difficult to attribute the ability of the composite to successfully pass through a double backer corrugator to any particular feature or features. However, a tentative theory is that the substantial amount of polyethylene impregnating and bonding agent present in the composite softens slightly in passing over the hot plate, so as to act as a cushion and reduce or eliminate scuffing of the film as it drags over the hot plate. Also, it may be that the paper and the substantial amount of polyethylene impregnated therein act as a heat sink to prevent excessive softening or bubbling of the polyethylene overlying the paper and forming the new or enhanced surface to which the film is bonded.

In the making of the composite, conditions should be controlled such that in the completed composite there generally is at least about 0.5 mil of polyethylene between the reverse printed film and the surface of the paper. This generally ensures that paper fibers, with or without the preferred flame treatment operation, do not contact the inner surface of the film. In general, in the extracted composite the polyethylene should be generally uniform over the area of the composite in amount of at least about five pounds per thousand square feet of composite, with preferably at least about three pounds of polyethylene per thousand square feet being generally uniformly present between the printed film and the surface of the paper to form the new and enhanced surface. Where the paper is of the order of forty-two pound (forty-two pounds per thousand square feet) liner board, the preferred minimum total polyethylene is at least about six pounds per thousand square feet of composite, with a preferred range being about nine pounds to fourteen pounds per thousand square feet of composite.

It should be understood that the range for the use of polyethylene bonding agent is also applicable when an ethylene-acrylic acid copolymer is used.

Preferably the extruded molten polymer, preferably polyethylene, passes into the nip at a rate corresponding to continuous thickness of at least about one mil relative to the speed of the webs, and advantageously this continuous thickness should be at least about 1.5 mils. As previously mentioned, impregnation of the polyethylene or other polymer into the paper may be controlled by controlling the temperature of the molten polyethylene and the machine speed. In general, decreasing the temperature of the polyethylene decreases impregnation. Therefore, the polyethylene should be kept at a high temperature, typically about 600° F. or higher. If clay coated paperboard is used in the process, it is generally necessary to use a very high temperature for the polyethylene so as to ensure migration through the clay coating and impregnation into the paperboard. The clay coated paperboard, even though it has an improved surface relative to uncoated Kraft paper, generally should be flame treated about the same as uncoated Kraft paper, but possibly slightly less. If using clay coated paperboard, it is important not to drive off too much moisture, particularly from the opposite face of the paperboard, since otherwise the opposite face will re-attract moisture and cause curling, possibly more so than for uncoated Kraft. While usable in the invention, clay coated paperboard is not preferred because of its expense, one feature of the invention being the provision of a high quality product from a low grade or relatively inexpensive paper or paperboard. It is also to be noted that in general machine finished paper does not work as well as plain Kraft paper or paperboard. This is believed to be because machine finished paper has a polished surface, and is not sufficiently porous for the most advantageous practice of the invention. In general, natural Kraft paper, unbleached and uncoated, works well in the practice of the invention.

In general the printing of the film will involve continuous cover printing where high quality graphics are desired, although this is not critical to the invention for some uses where high quality graphics are not needed or where only the structural features are desired. However, as a variant of the invention as previously described, high quality graphics could be obtained by printing the film without continuous print cover, that is, with some unprinted areas. The film so printed then could be extrusion mounted on metallized film, which then would be combined with paperboard to form a composite as previously described. The metallized surface of the metallized film should be toward the paperboard.

Apart from the packaging field, a principal use of the composite is in the manufacture of wall paneling by laminating the composite to wallboard such as particle board or plywood, the paper surface being laminated to the wallboard. The composite for such use is made in the same general manner previously described, except that a lighter weight of paper can be used in the composite, such as ten pound or twelve pound Kraft paper. This results in a scuff resistant panel of high graphics quality. Where high gloss is undesired, delustered film such as delustered Mylar film may be used. Alternatively, polypropylene film could be used. The film need not be, but preferably is, biooriented since this produces a better quality product, and avoids fabrication problems that might arise because of the relatively less stability of unoriented film.

An outstanding characteristic of the composite of the invention relative to conventional laminates is its resistance to separation, "checking," cracking, etc. when being scored to form box blanks, for instance, or when being folded into completed boxes or other containers. Scoring involves substantial compression in a small area, and in many laminates can result in separation or delamination, which does not occur with composites in accordance with the present invention. The reason for this is difficult to pin down to a particular feature, but it is believed to result from a combination of the substantial impregnation of the polyethylene into the paper and the overall cushioning effect: provided by the impregnated and unimpregnated polyethylene. No doubt the preferred biooriented polyester film contributes to this also. In general, containers of which the composite of the invention forms the outer surface have a smooth, high-gloss surface that will not separate or "check" in the corners after scoring.

Cartons or boxes made from the composite per se or it its corrugated form not only provide high strength and resistance to crushing, but also are moisture proof or resistant and retain fragrance, characteristics which are extremely important in primary container packaging for products such as laundry detergents, soap, etc.

The paper or paperboard used in the composite of the present invention generally may be any paper suitable for folding cartons or corrugated board or as a substrate for laminating to a backing such as wallboard. The preferred paper is Kraft paper of a weight known as liner board or paperboard. As is well-known in the art, Kraft paper is paper produced by a chemical cooking process using sodium hydroxide and sodium sulfide, and there are many different types of Kraft paper manufactured with various additives and treatments for various applications. Natural Kraft paper generally refers to Kraft paper which has not been bleached or dyed. Of course, paper itself refers to a web of cellulosic fibers in sheet form. The invention can also make good use of reprocessed paper, that is, not virgin Kraft paper. In general, the heaviest paper presently contemplated as useful in the invention is twenty-two point Kraft liner board having a weight of about ninety pounds per thousand square feet. The term "point," as generally used in the industry and herein, means a thickness of one-thousandth of an inch for each point. For composites to be incorporated in a corrugated structure, a preferred paper is natural Kraft paper (unbleached and uncoated), twenty six pounds per thousand square feet or heavier, and commonly about nine point. Other useful paperboard for corrugated structure incorporation is twenty-three pound paper, with thirty-three pound to forty-two pound paper being also typically useful. For some uses of the composite itself as secondary packaging, fifty pound, nine point Kraft would be a typical example. In general, one should use the least expensive and lowest grade paper that results in a composite having the necessary characteristics for the particular project.

The much preferred film for use in the composite of the invention is bioriented polyester such as DuPont's "Mylar" film, which is a strong, tough, clear plastic film made principally from polyethylene terephthalate and used widely in packaging, particularly flexible packaging. Polypropylene terephthalate might be used where less scuff resistance is needed, but the film preferably should be cross-linked by radiation after formation of the composite. Radiation cross-linking itself is well-known in the art. The presently preferred "Mylar", film is one-half mil (forty-eight-gauge). Where the composite is to be used in a corrugated structure, the film should be a bioriented film of high heat resistance sufficient to successfully go through the double-backer part of a conventional corrugator having a heat plate or table operating at about-between 250° and 350°.

The preferred impregnating and bonding agent is polyethylene, typically a low density polyethylene (LDPE) having a melt index between twelve and fifteen. For use in a composite to be incorporated in a corrugated structure, one should generally use the lowest density polyethylene that will successfully go through the double backer part of a conventional corrugated board making machine. Examples of suitable polyethylene resins are Eastman 1390, of 0.915 density and melt Index of fifteen, manufactured by a subsidiary of Eastman Kodak Company. Another example is DuPont's "Alathon" 1570, a low density polyethylene resin known for use in flexible packaging. A portion of the polyethylene bonding agent may be high density polyethylene (HDPE), if desired. An ethylene acrylic acid copolymer may also be used as a bonding agent in lieu of the polyethylene.

As previously started, the molten polyethylene preferably is extruded at 600° F. or higher, but this should be varied as needed to achieve the desired substantial impregnation into the paper. In general, the extrusion temperatures used are substantially higher than would be necessary merely to adhere two components together in a conventional laminating process, the higher temperatures facilitating the impregnation. As an example, if the molten polyethylene is of 1.5 mils continuous thickness out of the extruder, conditions should be maintained such that at least about one-half mil will penetrate and impregnant the board. Examples of ethylene acrylic acid copolymers are those produced by Dow Chemical under the trademark Primacor and DuPont under the name Nucrel® 3990L. The ethylene acrylic acid copolymer can be extruded as low as 500° F., but preferably at around 540° F. which is substantially less than the temperatures required to extruder polyethylene. The lower extrusion temperature results in less damage to the ink printed on the surface of the film.

As a typical example of making a composite for use as the outside liner for a double-faced corrugated board one could use one-half mil bioriented polyester film (typically "Mylar"), twenty-three pound paper, and at least one mil thickness of polyethylene out of the extruder and through the nip. As another typical example, the composite would involve forty-eight gauge (one-half mil) bioriented polyester film, a minimum of 1.5 mils thickness polyethylene out of the extruder and through the nip (of which at least one-half mil should penetrate and impregnate the liner board), the polyethylene being extruded between about 600° and 640° F. and being of low to medium density, and twenty-six pound low density Kraft paper of nine point thickness. An alternative paper could be thirty-three pound to forty-two pound Kraft paper. As an example of a composite for use in secondary packaging, such as a "six-pack" or "twelve-pack" for cans or bottles, there could be used sixteen point, fifty pound Kraft paper, forty-eight gauge bioriented polyester film, and two mils continuous thickness of polyethylene out of the extruder and through the nip.

As mentioned previously, it is known in the art to laminate paper and polyester film, including bioriented polyester film, using a polyethylene adhesive in, for instance, flexible packaging. It is also known in the art to produce a laminate of polyester and paperboard by coextruding polyester and polyethylene adhesive onto paperboard which has been pretreated by flame priming, the polyethylene adhesive layer being thinner than the one half mil polyester outer layer, as described in Thompson, U.S. Pat. No. 4,455,184, issued Jun. 19, 1984. Kozlowski, U.S. Pat. No. 4,064,302 relates to flexible, semi-rigid fabricating material, and mentions "Mylar," among others, bonded to paper or paperboard by an adhesive coating of thermoplastic polyethylene. The previously mentioned Peer, U.S. Pat. No. 4,254,173 discloses a secondary container packaging material for use in six-pack can wraps, etc. comprising a laminate of a paper material laminated to a plastic film, which paper may be natural Kraft paper among others, which film may be polyethylene terephthalate, among others, the film being reverse printed, a mentioned adhesive being a polyethylene resin, among others. However, these known or proposed products do not respond to the structural and appearance features of the present invention and are all believed to be distinctly different from the present invention.

The use of a large amount of polyethylene bonding agent results in a laminate that is much more difficult to pull apart than laminates that have been made in the past. For example, two sample laminates were prepared, one with 2.67 pounds of polyethylene per thousand square feet and one with 6.67 pounds of polyethylene per thousand square feet. A one inch strip of each sample was tested in a Instron tester to determine the amount of force necessary to separate the laminated polyester from the liner board. A force of 200 grams per square inch was required to separate the liner board that contained 2.67 pounds of polyethylene per thousand square feet. When the amount of polyethylene was increased to 6.67 pounds of polyethylene per thousand square feet, 350 grams of force per square inch was required to separate the laminated polyester from the liner board. This 75% increase in the amount of force required to separate the laminated polyester from the sample that contained 6.67 pounds of polyethylene per thousand square feet proves the creation of a bond at a geometrically higher level. This type of bond has been found to be essential to allow the laminated board to be processed through a corrugator. It is surprising that the extra amount of polyethylene increases the bond as at least three pounds of the polyethylene is on the surface of the board.

It should be pointed out that the film may be metalized and may coated. The film can be reverse printed or printed on the main surface. The film may also be pigmented (e.g., gold).

The composite is extremely useful as a sheet upon which foods can be baked in a convection (forced air) oven in a bakery, frozen and shipped to grocery stores for purchase by consumers. The composite material can be corrugated preferably to form a B-flute which is the preferred construction for baking. The corrugated material can be formed into a tray on which the food is baked and then alternatively, a removable collar can be placed around the baking sheet to contain the batter during baking. The collar can then be removed after baking. The frozen foods product can be served on the baking sheet and, if desired, the food product may be heated in a conventional oven by the consumer. This composite does not deteriorate throughout the baking, freezing and reheating process. The use of this composite material eliminates and reduces the need for the use of grease between the bakery product and the composite, as the film of the composite has an excellent release characteristic. The corrugated sheet as constructed can be utilized for baking in a convection (forced air) oven where the temperatures in the oven will range up to 350° F. for a period of forty to eighty minutes with the internal temperature of the bakery product reaching 200–208° F. The corrugated structure provides additional strength for the baking sheet or for a tray from which the sheet may be made.

One advantage of forming the corrugated material into a tray is that web corners can be formed to contain the liquid batter without leakage.

Because of the moisture resistant characteristics of this composite material, it can be used to form a cooler keeping the product contained in the design container cold for an extended period of time. This can also be used for a hot product contained within the container.

In the foregoing, I have described and illustrated the inventive concepts with reference to illustrative and presently preferred embodiments of my invention. However, the scope and substance of my invention are as set forth in the ensuing claims as interpreted in the light of the foregoing description and illustrations, and it is intended that the claims be construed as including alternative embodiments, except insofar as limited by the prior art.

I claim:

1. A method of making a composite of paper and plastic film, comprising passing into and through the nip of a pair of nip rolls a web of Kraft paper and a web of plastic film of bioriented polyester, extruding a molten plastic impregnating and bonding agent of ethylene acrylic acid copolymer at a temperature of at least 500° F. into the nip between said webs of a thickness such that the combined thickness of the molten plastic, the paper web and the plastic film web passing into the nip are greater than the least dimension of said nip; the porosity of the paper, the moisture content near an inner surface of the paper, the pressure of the nip rolls, and the thickness, temperature and viscosity of said molted plastic agent being such that part of said molten plastic agent impregnates partially into and becomes part of said paper web and a substantial part of the plastic agent extends outwardly of the inner surface of the paper and forms a new solidified surface on which the plastic film is supported and to which it is firmly bonded, wherein about three pounds of the plastic impregnating and bonding agent per thousand square feet is generally uniformly present between said film and the inner surface of the paper, and extracting from the nip rolls said composite consisting of paper at least partially impregnated with the plastic impregnating and bonding agent so as to be inseparable therefrom without destruction of the paper, the new surface of the plastic agent clear of the inner surface of the paper, and the plastic film web supported on and bonded to the new surface of plastic agent clear of the inner surface of the paper, the thickness of the composite being less than the combined thicknesses of the paper web, the extruded layer of molten plastic, and the plastic film web, passing into the nip, and the plastic impregnating and bonding agent being extruded generally uniformly over the area of the composite in an amount of at least six pounds per thousand square feet.

2. A method as claimed in claim 1 wherein the inner surface of said plastic film is provided with a decorative surface coat before passing into said nip.

3. A method as claimed in claim 2 wherein the inner surface of said plastic film is printed before passing into said nip.

4. A method as claimed in claim 1 wherein the extruded layer of molten ethylene acrylic acid copolymer passing into the nip is of substantially greater thickness than said bioriented polyester film and substantially less thickness than said paper web.

5. A method as claimed in claim 1 further comprising providing a single-faced corrugated paperboard having a corrugated medium with flute tips on one side of said medium with adhering a paper surface of said composite to the flute tips on one side of the corrugated medium so as to form a double-faced corrugated paperboard.

6. A method as claimed in claim 5 wherein said composite is adhered to the flute tips of said corrugated medium by adhesively applying the paper surface of the composite to the exposed flute tips of the single-faced corrugated paperboard in a double faced combining section of a corrugating machine having a hot plate section such that the composite forms the outside liner of a double faced corrugated paperboard and the exposed outer face of said film moves along the hot plate section in passing through the machine.

7. A method as claimed in claim 6 wherein said double-faced corrugated paperboard is subsequently subjected to one or more of cutting, scoring, slotting and slitting.

8. A method as claimed in claim 1 in which the moisture content of the inner surface of the paper is controlled by flame treating the inner surface of said paper before passing into said nip so as to remove some of the loose or protruding fibers and lower the water content so as to provide a smoother paper surface and minimize paper surface fibers extending to the new surface of the plastic agent.

9. A method as claimed in claim 4 wherein said extruded molten ethylene acrylic acid copolymer is extruded into said nip at a temperature of approximately 540° F., and a nip roll contacted by the film is a chill roll.

10. A method as claimed in claim 9 wherein said polyester film is pretreated on an inner surface by a pretreatment selected from corona treatment and chemical etching.

11. A method as claimed in claim 9 wherein an inner surface of the film is treated with a urethane primer before printing.

12. A method as claimed in claim 3 wherein the operating conditions are such that in the extracted composite there is at least about 0.5 mil of ethylene acrylic acid copolymer between said printed film and the surface of the paper.

13. A method of making a composite of paper and film comprising passing into and through the nip of a pair of nip rolls a web of Kraft paper and a web of plastic film of bioriented polyester; extruding a layer of molten ethylene acrylic acid copolymer impregnating and bonding agent into the nip between the webs on the entry side of the nip; controlling one or more of the speed of the webs, the temperature of the molten ethylene acrylic acid copolymer, the pressure or spacing of the rolls at the nip, and the rate of extrusion, relative to the porosity and surface characteristics of the paper web, and controlling the moisture content near an inner surface of said paper web, such that a substantial portion of the molten ethylene acrylic acid copolymer impregnates partially into and becomes part of the paper web and a substantial portion lies outwardly of the surface of the paper web and solidifies to form a new surface to which the film is bonded and on which the film is supported clear of the inner paper surface, wherein about three pounds of the plastic impregnating and bonding agent per thousand square feet is generally uniformly present between said film and the inner surface of the paper; and collecting from the nip rolls said composite comprising paper partially impregnated with solidified ethylene acrylic acid copolymer, a contiguous layer of solidified ethylene acrylic acid copolymer having said new surface outwardly of the paper inner surface, and the plastic film bonded to said new surface, and the ethylene acrylic acid copolymer being generally uniform over the area of the composite in an amount of at least about nine pounds per thousand square feet.

14. A method as claimed in claim 13, wherein the inner surface of said film is reverse printed.

15. A method as claimed in claim 13 wherein the reverse printed film is pretreated on its inner surface by a pretreatment selected from corona treatment and chemical etching.

16. A method as claimed in claim 13 wherein said film is pretreated on an inner surface by a pretreatment selected from corona treatment and chemical etching.

17. A method as claimed in claim 13 wherein a nip roll adjacent said paper web is a vacuum roll imposing suction on said paper web, and a nip roll adjacent said plastic film web is a chill roll.

18. A method as claimed in claim 13 wherein the operating conditions are such that the extruded molten ethylene acrylic acid copolymer passes into the nip at a rate corresponding to a continuous thickness of at least about 1.5 mil.

19. A method as claimed in claim 13 wherein the operating conditions are such that the solidified ethylene acrylic acid copolymer lying outwardly of said inner surface of the paper is of at least about 0.5 mil thickness.

20. A method as claimed in claim 13 further comprising treating the inner surface of said paper before passing into said nip so as to remove some of the loose or protruding fibers and surface dust and lower the water content so as to provide a smoother paper surface, enhance impregnation by the molten polymer to replace the lowered water content, and minimize the risk of paper surface fibers extending to the polymer surface.

* * * * *